(12) United States Patent
Furubayashi

(10) Patent No.: US 11,318,654 B2
(45) Date of Patent: May 3, 2022

(54) METHOD AND DEVICE FOR MANUFACTURING RUBBER COATED CORD

(71) Applicant: The Yokohama Rubber Co., LTD., Tokyo (JP)

(72) Inventor: Yuki Furubayashi, Shinshiro (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 17/269,454

(22) PCT Filed: Jun. 14, 2019

(86) PCT No.: PCT/JP2019/023679
§ 371 (c)(1),
(2) Date: Feb. 18, 2021

(87) PCT Pub. No.: WO2020/039715
PCT Pub. Date: Feb. 27, 2020

(65) Prior Publication Data
US 2021/0252762 A1    Aug. 19, 2021

(30) Foreign Application Priority Data

Aug. 23, 2018 (JP) ............................. JP2018-156073

(51) Int. Cl.
*B29C 48/154* (2019.01)
*B29C 48/345* (2019.01)
(Continued)

(52) U.S. Cl.
CPC .......... *B29C 48/34* (2019.02); *B29C 48/0021* (2019.02); *B29C 48/0022* (2019.02);
(Continued)

(58) Field of Classification Search
CPC .............. B29C 48/001; B29C 48/0021; B29C 48/0022; B29C 48/154; B29C 48/156;
(Continued)

(56) References Cited

U.S. PATENT DOCUMENTS

2018/0065317 A1* 3/2018 Tyler ...................... B29C 48/12

FOREIGN PATENT DOCUMENTS

| CN | 101733943 | 6/2010 |
| CN | 101835589 | 9/2010 |

(Continued)

*Primary Examiner* — Xiao S Zhao
*Assistant Examiner* — Joseph S Leyson
(74) *Attorney, Agent, or Firm* — Thorpe North & Western

(57) ABSTRACT

A method and a device for manufacturing a rubber coated cord, comprising:
a rubber coated cord including a preceding cord is manufactured by causing the preceding cord to pass through a preceding head while filling the preceding head with unvulcanized rubber extruded from a rubber extruder, and a rubber coated cord including a next cord is manufactured by setting a leading edge portion of the next cord in a state where the leading edge portion of the next cord has passed through the next head in advance, manufacturing a predetermined length of the rubber coated cord including the preceding cord, and subsequently causing the next cord including a leading edge portion side range bonded to a trailing edge portion of the rubber coated cord including the preceding cord to pass through the next head while switching from the preceding head to the next head.

9 Claims, 25 Drawing Sheets

(51) Int. Cl.
*B29C 48/255* (2019.01)
*B29C 48/34* (2019.01)
*B29C 48/05* (2019.01)
*B29D 30/38* (2006.01)
*B29C 48/00* (2019.01)

(52) U.S. Cl.
CPC ............ *B29C 48/05* (2019.02); *B29C 48/154* (2019.02); *B29C 48/2556* (2019.02); *B29C 48/345* (2019.02); *B29D 30/38* (2013.01)

(58) Field of Classification Search
CPC ..... B29C 48/2556; B29C 48/28; B29C 48/34; B29D 30/38
See application file for complete search history.

(56) References Cited

FOREIGN PATENT DOCUMENTS

| | | |
|---|---|---|
| JP | 7-88925 A | 4/1995 |
| JP | 2005-343685 A | 12/2005 |
| JP | 2007-216635 A | 8/2007 |
| JP | 2008-272966 A | 11/2008 |
| JP | 2016-14207 A | 1/2016 |
| JP | 2016-107932 A | 6/2016 |
| WO | 2011/030764 A1 | 3/2011 |

\* cited by examiner

METHOD AND DEVICE FOR MANUFACTURING RUBBER COATED CORD

TECHNICAL FIELD

The present technology relates to a method and a device for manufacturing a rubber coated cord, and particularly relates to a method and a device for manufacturing a rubber coated cord that can provide accelerated cord replacement work and improved productivity in continuous manufacture of a rubber coated cord including an outer circumferential surface coated with unvulcanized rubber.

BACKGROUND ART

At the steps of manufacturing a rubber product such as a tire, a rubber coated cord including an outer circumferential surface coated with unvulcanized rubber is used. For manufacture of a rubber coated cord, an outer circumferential surface of a cord is coated with unvulcanized rubber by extruding the unvulcanized rubber into a coating head installed in a rubber extruder and causing the cord to pass through the coating head (for example, see Japan Unexamined Patent Publication No. 2008-272966). In the continuous manufacture of a rubber coated cord in this manner, in a case where, for example, all of the cord passing through the coating head is paid out of a reel or the cord is cut in the middle, replacement work of setting a next cord in the coating head is required.

The replacement work is cumbersome work involving, for example, disassembling a head part, causing a leading edge portion of the next cord to pass through the head, and re-assembling the head part, and thus requires a significant amount of time. During the cord replacement work, production of a rubber coated cord is interrupted, and thus there is room for enhancement in improving productivity.

SUMMARY

The present technology provides a method and a device for manufacturing a rubber coated cord that can provide accelerated cord replacement work and improved productivity in continuous manufacture of a rubber coated cord including an outer circumferential surface coated with unvulcanized rubber.

A method for manufacturing a rubber coated cord according to an embodiment of the present technology is a method for manufacturing a rubber coated twisted cord, the method including manufacturing a rubber coated cord by causing a cord to pass through a coating head while filling the coating head with unvulcanized rubber extruded from a rubber extruder and coating an outer circumferential surface of the cord with the unvulcanized rubber, the method including manufacturing the rubber coated cord including a preceding cord by installing a plurality of the coating heads, selecting one head of the plurality of coating heads as a preceding head, and causing a preceding cord, which is to be used in advance as the cord, to pass through the preceding head while filling the preceding head with the unvulcanized rubber, and manufacturing the rubber coated cord including a next cord by selecting, as a next head, one head differing from the preceding head, setting a leading edge portion of a next cord, which is to be used next as the cord, in a state where the leading edge portion of the next cord has passed through the next head in advance, manufacturing a predetermined length of the rubber coated cord including the preceding cord, and subsequently causing the next cord including a leading edge portion side range bonded to a trailing edge portion of the rubber coated cord including the preceding cord to pass through the next head while switching from the preceding head to the next head and filling the next head with the unvulcanized rubber.

A device for manufacturing a rubber coated cord according to an embodiment of the present technology is a device for manufacturing a rubber coated cord, the device including a pay-out unit and a draw-out unit for a cord, a rubber extruder, and a coating head installed between the pay-out unit and the draw-out unit and filled with unvulcanized rubber extruded by the rubber extruder, an outer circumferential surface of the cord being coated with the unvulcanized rubber by causing the cord moving from the pay-out unit to the draw-out unit to pass through the coating head filled with the unvulcanized rubber, the device including a plurality of the coating heads, one of the plurality of the coating heads being selected as a preceding head through which a preceding cord to be used in advance as the cord passes, one head differing from the preceding head being selected as a next head through which a next cord to be used next as the cord passes, the device including a switching mechanism that selectively feeds the unvulcanized rubber to any one of the preceding head or the next head, a leading edge portion holding machine that holds a leading edge portion of the next cord having passed through the next head in advance, a trailing edge portion holding machine that holds a trailing edge portion of a predetermined length of the rubber coated cord manufactured by using the preceding cord, and a bonding mechanism that bonds the trailing edge portion to a leading edge portion side range of the next cord.

According to an embodiment of the present technology, while a rubber coated cord is being manufactured in advance by using a preceding head and a preceding cord, a next cord can be set to a next head. Then, immediately after the rubber coated cord including the preceding cord is manufactured, a leading edge portion side range of the next cord is bonded to a trailing edge portion of the rubber coated cord including the preceding cord, and the next cord is caused to pass through the next head. Accordingly, a rubber coated cord including the next cord can be manufactured continuously. Thus, this is advantageous in accelerating replacement work of the preceding cord and the next cord, and accordingly improving the productivity of the rubber coated cord.

DETAILED DESCRIPTION

A method and a device for manufacturing a rubber coated cord according to embodiments of the present technology will be described specifically below based on embodiments illustrated in the diagrams.

Figure 1:
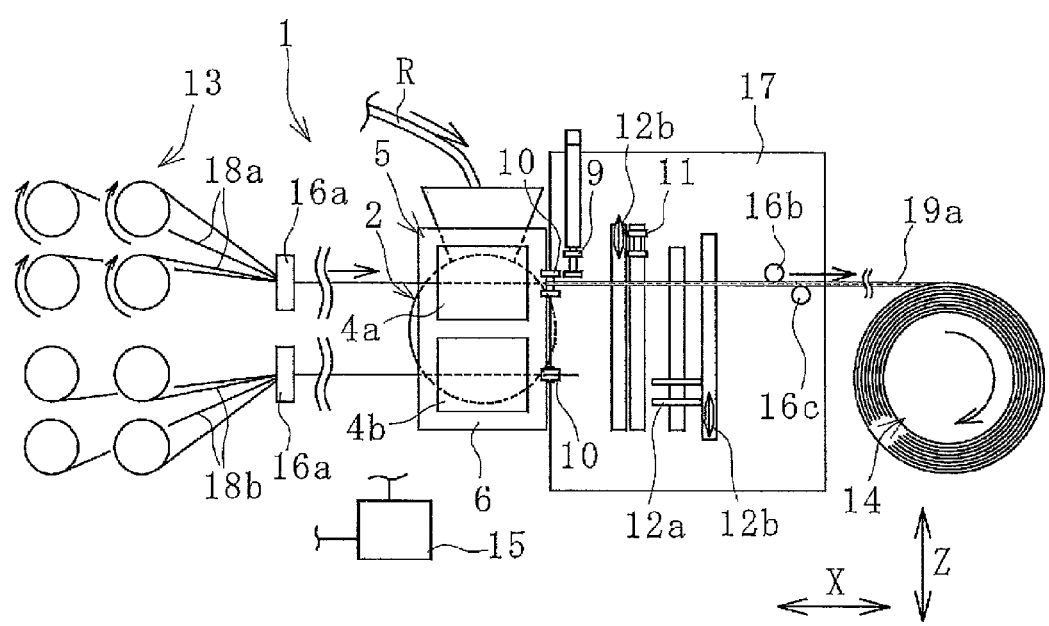
FIG. 1 is an explanatory diagram illustrating a device for manufacturing a rubber coated cord according to an embodiment of the present technology in a front view.
Figure 2:
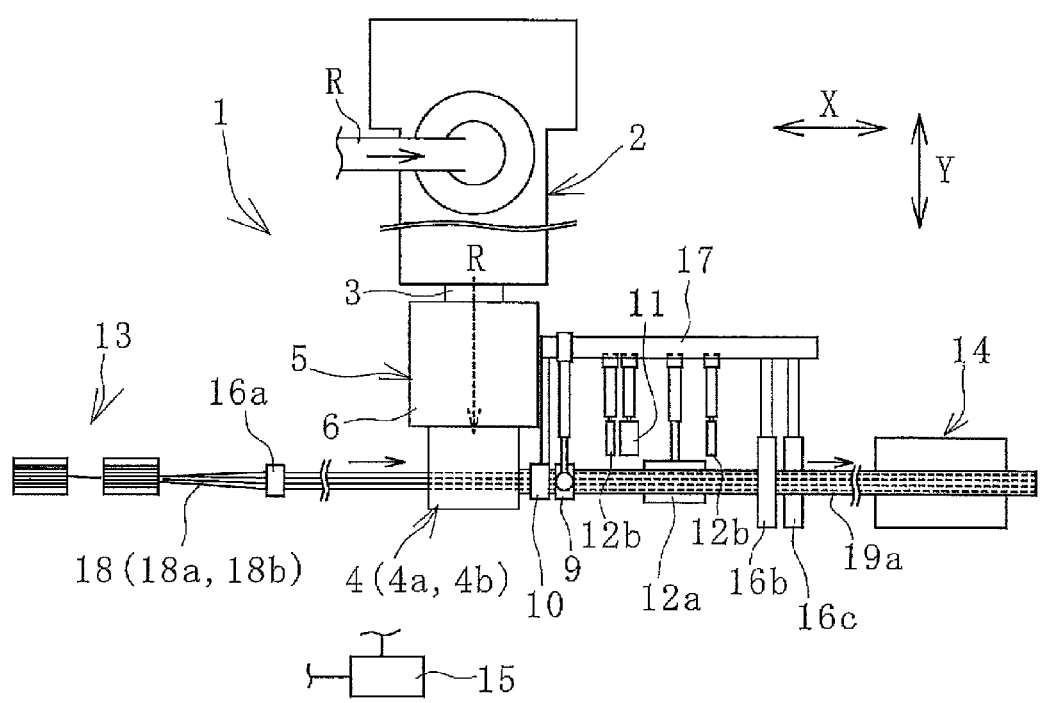
FIG. 2 is an explanatory diagram illustrating the manufacturing device of FIG. 1 in a plan view.
Figure 3:
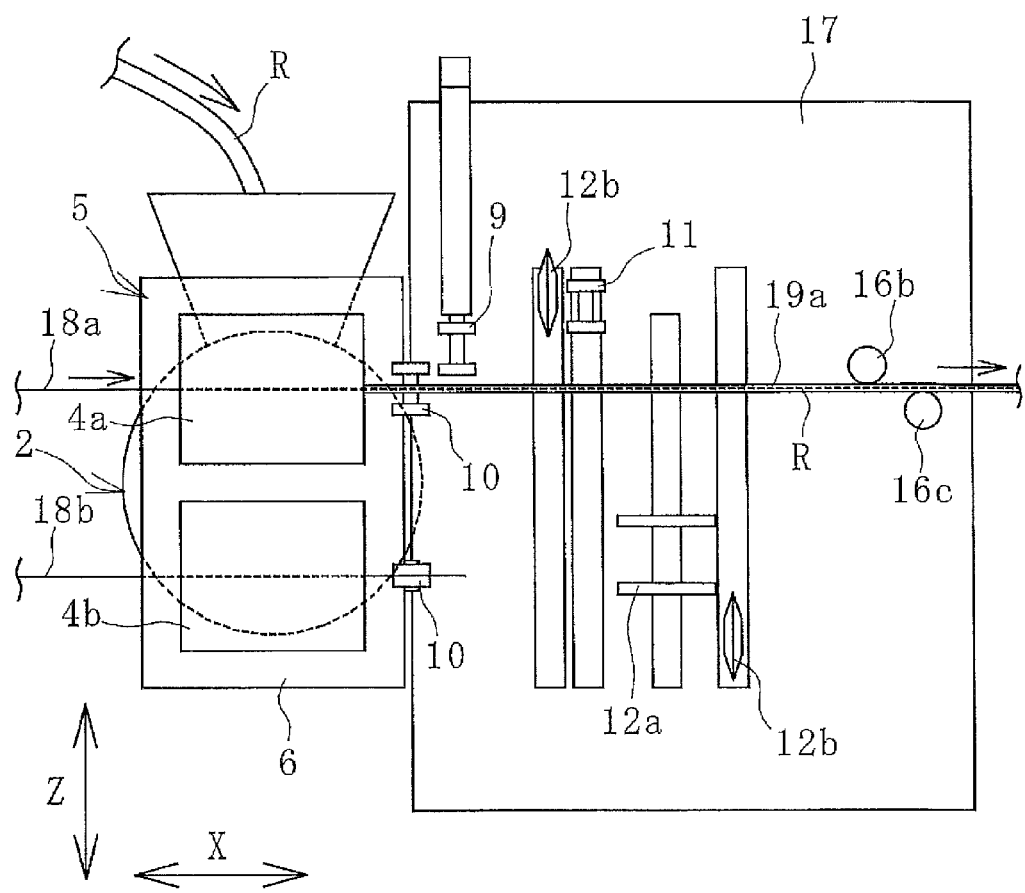
FIG. 3 is an explanatory diagram illustrating a periphery of a rubber extruder of FIG. 1 in an enlarged front view.

In a device 1 for manufacturing a rubber coated cord (hereinafter referred to as a manufacturing device 1) according to an embodiment of the present technology illustrated in FIGS. 1 to 3, an outer circumferential surface of a cord 18 (18a and 18b) is coated with unvulcanized rubber R extruded from a rubber extruder 2 and thus a rubber coated cord 19 (19a and 19b) is continuously manufactured. In FIGS. 1 to 3, the rubber coated cord 19a is manufactured by using the preceding cord 18a. The cord 18 is a metal cord or a resin cord, and for example, a twisted cord formed by twisting a plurality of filaments is used.

The manufacturing device 1 includes a pay-out unit 13 and a draw-out unit 14 for the cord 18, the rubber extruder 2 disposed between the pay-out unit 13 and the draw-out unit 14, and a plurality of coating heads 4 (a preceding head 4a and a next head 4b) disposed near an extrusion port 3 at a tip of the rubber extruder 2. The preceding cord 18a is continuous from the pay-out unit 13 to the draw-out unit 14.

In the diagram, X direction indicates a direction in which the cord 18 (rubber coated cord 19) moves between the pay-out unit 13 and the draw-out unit 14, Y direction indicates a direction orthogonal to and traversing the X direction, and Z direction indicates a direction orthogonal to and longitudinally traversing the X direction (in other words, the vertical direction). In the embodiment, the direction in which the unvulcanized rubber R is extruded from the rubber extruder 2 is orthogonal to the direction of movement of the cord 18 (X direction). However, an angle formed by the two directions is not limited to 90° and can be set to an appropriate angle.

Additionally, the manufacturing device 1 includes a switching mechanism 5 that selectively feeds the unvulcanized rubber R to any one of the preceding head 4a or the next head 4b, a trailing edge portion holding machine 10, a leading edge portion holding machine 11, a bonding mechanism 12a, and a control unit 15. In the embodiment, the manufacturing device 1 further includes a movement mechanism 9 and a cutting machine 12b. Operation of equipment constituting the manufacturing device 1 is controlled by the control unit 15.

The pay-out unit 13 that pays out the cord 18 stocked includes a reel around which the cord 18 is wound, for example. The pay-out unit 13 includes a brake that can adjust tension acting on the cord 18 paid out.

In the embodiment, the preceding cord 18a and the next cord 18b are separated into two lines and stocked in the pay-out unit 13. The cord 18 can be separated into three or more lines and stocked in the pay-out unit 13. In the embodiment, the preceding cord 18a and the next cord 18b have an identical specification, but can also have different specifications.

A guide 16a is disposed between the pay-out unit 13 and the coating head 4. A plurality of the preceding cords 18a are arranged side by side by one of the guides 16a and are fed to the preceding head 4a. A plurality of the next cords 18b are arranged side by side by the other of the guides 16a and fed to the next head 4b.

The draw-out unit 14 that draws out the cord 19 including an outer circumferential surface coated with the unvulcanized rubber R, in other words, the rubber coated cord 19, and that moves the rubber coated cord 19 forward includes, for example, a reel around which the rubber coated cord 19 is wound. The reel of the draw-out unit 14 is rotationally driven by a drive motor or the like and moves the cord 18 paid out of the pay-out unit 13, and the rubber coated cord 19 manufactured is wound around the reel of the draw-out unit 14 with a liner or the like interposed, and is stocked. The rubber coated cord 19 is supported by support rollers 16*b* and 16*c*, and moves between the coating head 4 and the draw-out unit 14.

A transport conveyor can also be used as the draw-out unit 14. A forming drum is disposed in front of the transport conveyor in the conveying direction, and the rubber coated cord 19 is cut into an appropriate length on the transport conveyor, and is conveyed to the forming drum. Accordingly, the rubber coated cord 19 manufactured can be used immediately to form a green tire.

The rubber extruder 2 extrudes the unvulcanized rubber R from the extrusion port 3 at substantially constant pressure. The temperature of the unvulcanized rubber R is, for example, 70° C. or more and 90° C. or less. The coating head 4 having a box shape is connected to the extrusion port 3 via the switching mechanism 5. In the embodiment, as the coating head 4, the preceding head 4*a* and the next head 4*b* are disposed above and below. The number of the coating heads 4 is not limited to two, and can be three or more. The coating head 4 is filled, via the switching mechanism 5, with the unvulcanized rubber R extruded by the rubber extruder 2.

Figure 4:
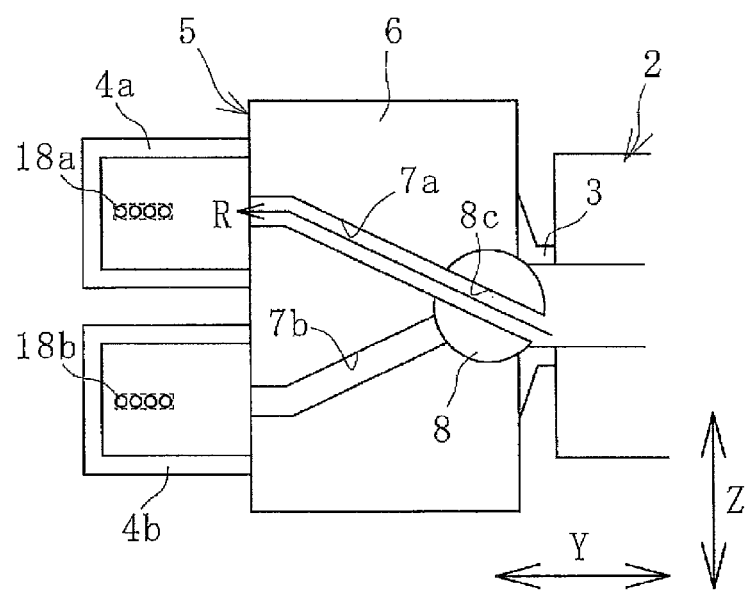
FIG. 4 is an explanatory diagram illustrating, in a cross-sectional view, a state where a switching mechanism of FIG. 1 feeds unvulcanized rubber to a preceding head.
Figure 5:
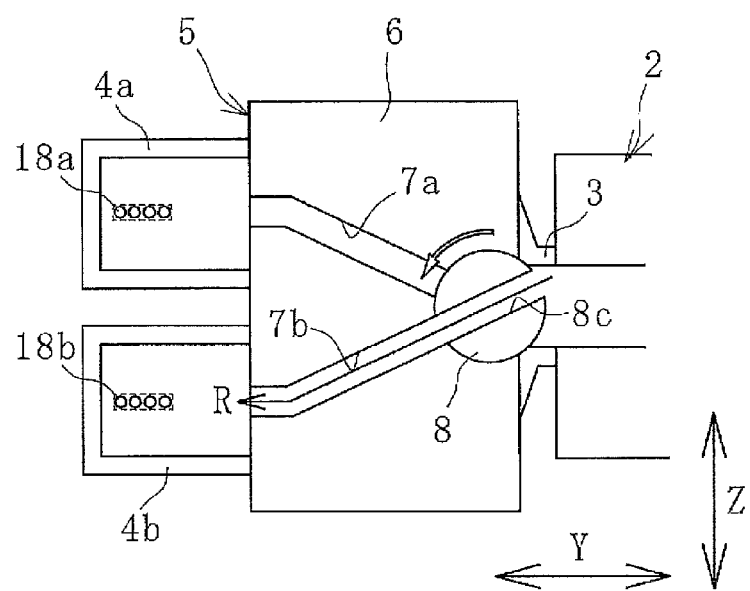
FIG. 5 is an explanatory diagram illustrating, in a cross-sectional view, a state where the switching mechanism of FIG. 4 feeds unvulcanized rubber to a next head.

As illustrated in FIGS. 4 and 5, the switching mechanism 5 feeds the unvulcanized rubber R to only either one of the preceding head 4*a* or the next head 4*b*. In the embodiment, the switching mechanism 5 includes a switching head 6 interposed between the extrusion port 3 and the coating head 4. Communication holes 7*a* and 7*b* are formed in the switching head 6, and a switching valve 8 is disposed at the communication holes 7*a* and 7*b*. The communication hole 7*a* communicates with the preceding head 4*a*, and the communication hole 7*b* communicates with the next head 4*b*, and the switching valve 8 includes a hole portion 8*c*.

The switching valve 8 is rotationally operated by control of the control unit 15, and a position of the hole portion 8*c* changes. As illustrated in FIG. 4, the hole portion 8*c* is aligned with the communication hole 7*a*, and the extrusion port 3 communicates through the communication hole 7*a* with the preceding head 4*a*. Accordingly, the unvulcanized rubber R is fed only to the preceding head 4*a*. As illustrated in FIG. 5, the hole portion 8*c* is aligned with the communication hole 7*b*, and the extrusion port 3 communicates through the communication hole 7*b* with the next head 4*b*. Accordingly, the unvulcanized rubber R is fed only to the next head 4*b*.

A leading edge portion holding machine 10 is disposed in a downstream side in the X direction of each of the preceding head 4*a* and the next head 4*b*. Each of the leading edge portion holding machines 10 includes a pair of clamps, for example. One of the leading edge portion holding machines 10 holds a leading edge portion of the preceding cord 18*a* having passed through the preceding head 4*a* in advance. The other of the leading edge portion holding machines 10 holds a leading edge portion of the next cord 18*b* having passed through the next head 4*b* in advance. In the embodiment, each of the leading edge portion holding machines 10 is attached to a tip of an arm extending in the Y direction from a frame wall 17 erected in a downstream side in the X direction of the switching head 6.

The trailing edge portion holding machine 11 includes a pair of clamps, for example. The trailing edge portion holding machine 11 holds a trailing edge portion of a predetermined length of the rubber coated cord 19 manufactured. In the embodiment, the trailing edge portion holding machine 11 is attached to a tip of a rod of a fluid cylinder extending in the Y direction from the frame wall 17 and moving up and down. Since the rod advances/withdraws in the Y direction, the trailing edge portion holding machine 11 can be moved to desired positions in the Y direction and the Z direction.

The bonding mechanism 12*a* is disposed in a downstream side in the X direction of the trailing edge portion holding machine 11. The bonding mechanism 12*a* includes, for example, a pair of clamps. The bonding mechanism 12*a* bonds a trailing end portion of the rubber coated cord 19*a* manufactured by using the preceding cord 18*a* and a leading edge portion side range of the next cord 18*b*.

In the embodiment, the bonding mechanism 12*a* is attached to the tip of the rod of the fluid cylinder extending in the Y direction from the frame wall 17 and moving up and down. Since the rod advances/withdraws in the Y direction, the bonding mechanism 12*a* can be moved to desired positions in the Y direction and the Z direction.

The movement mechanism 9 holds the leading edge portion of the cord 18 held by the leading edge portion holding machine 10 and moves the leading edge portion toward the bonding mechanism 12*a*. The movement mechanism 9 includes, for example, a pair of clamps. In the embodiment, the movement mechanism 9 is attached to a lower end of the rod of the fluid cylinder extending in the vertical direction, and the rod advances/withdraws in the Z direction. Additionally, the fluid cylinder extending up and down is attached, at an upper end portion of the frame wall 17, to the tip of the rod of the fluid cylinder extending in the Y direction. The fluid cylinder extending in the Y direction moves the upper end portion of the frame wall 17 in the X direction, and the rod advances/withdraws in the Y direction. Thus, the movement mechanism 9 can be moved to desired positions in the Y direction and the Z direction.

The cutting machine 12*b* is disposed in each of an upstream side in the X direction of the trailing edge portion holding machine 11 and a downstream side in the X direction of the bonding mechanism 12*a*. In the embodiment, each of the cutting machines 12*b* is attached to the tip of the rod of the fluid cylinder extending in the Y direction from the frame wall 17 and moving up and down. Since the rod advances/withdraws in the Y direction, each of the cutting machines 12*b* can be moved to desired positions in the Y direction and the Z direction.

The support rollers 16*b* and 16*c* extending in the Y direction from the frame wall 17 and are disposed in a downstream side of the cutting machine 12*b* disposed in the downstream side in the X direction of the bonding mechanism 12*a*. The support rollers 16*b* and 16*c* are movable in the vertical direction.

In the embodiment, the movement mechanism 9, the trailing edge portion holding machine 10, the leading edge portion holding machine 11, the bonding mechanism 12*a*, and the cutting machine 12*b* are configured to be moved linearly by the fluid cylinder, but no such limitation is intended. These pieces of equipment can also be configured to turn or rotationally move by using a known mechanism.

Next, an example of a procedure of the method for manufacturing a rubber coated cord according to an embodiment of the present technology will be described.

As illustrated in FIGS. 1 to 3, one of the plurality of coating heads 4 is selected as the preceding head 4*a*, and the preceding head 4*a* is filled with the unvulcanized rubber R extruded from the rubber extruder 2. Additionally, a cord to be used in advance of the cords 18 stocked is selected and is caused to pass through the preceding head 4*a* as the preceding cord 18*a*. Accordingly, the rubber coated cord 19*a* including the outer circumferential surface of the preceding cord 18a coated with the unvulcanized rubber R is manufactured.

In the embodiment, a plurality of the preceding cords 18a arranged side by side are caused to pass through the preceding head 4a. Accordingly, the rubber coated cord 19a including the plurality of the preceding cords 18a integrated together side by side is manufactured. The rubber coated cord 19a is wound by the draw-out unit 14, and the preceding cord 18a moves from the pay-out unit 13 to the draw-out unit 14. In this manner, the preceding cord 18a is caused to pass through the preceding head 4a while filling the preceding head 4a with the unvulcanized rubber R, and the rubber coated cord 19a is continuously manufactured.

At this time, the movement mechanism 9, the trailing edge portion holding machine 11, the bonding mechanism 12a, and the cutting machine 12b each stand by in a standby position. Additionally, the leading edge portion of the next cord 18b to be used next is set in a state where the leading edge portion of the next cord 18b has passed through the next head 4b in advance. Specifically, the leading edge portion of the next cord 18b having passed through the next head 4b is held by the leading edge portion holding machine 10.

When a predetermined length of the rubber coated cord 19a including the preceding cord 18a is manufactured and thus a stock amount of the preceding cord 18a is exhausted or the stock amount is equal to or less than a predetermined amount, the cord 18 to be used is switched from the preceding cord 18a to the next cord 18b. This replacement work is performed as exemplified below.

Figure 6:
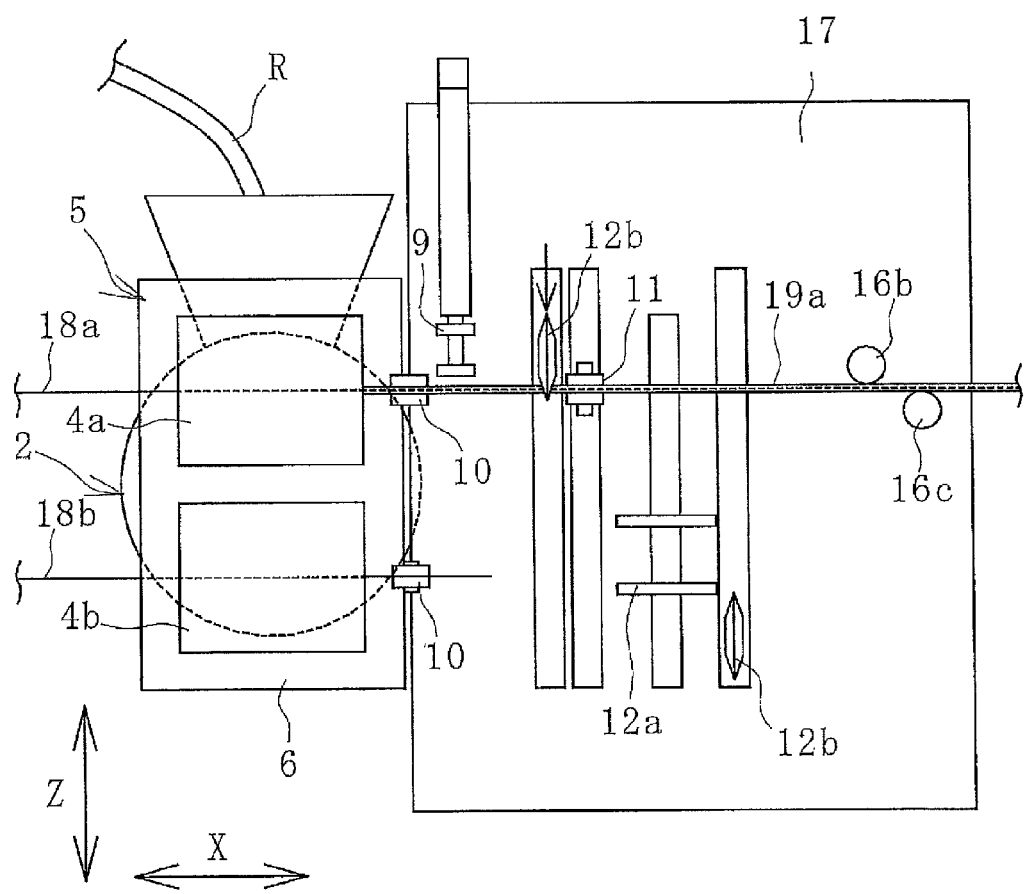
FIG. 6 is an explanatory diagram illustrating, in a front view, the step of holding and cutting a trailing edge portion of a preceding cord of FIG. 3 by a trailing edge portion holding machine.

First, the movement of the preceding cord 18a by the draw-out unit 14 is stopped, and the extrusion of the unvulcanized rubber R by the rubber extruder 2 is also stopped. As illustrated in FIG. 6, the rubber coated cord 19a manufactured is held by the trailing edge portion holding machine 11. At this time, the rubber coated cord 19a may be held by the leading edge portion holding machine 10. In this state, the rubber coated cord 19a is cut between the trailing edge portion holding machine 11 and the leading edge portion holding machine 10 by using the cutting machine 12b disposed in the upstream side in the X direction of the trailing edge portion holding machine 11.

Figure 7:
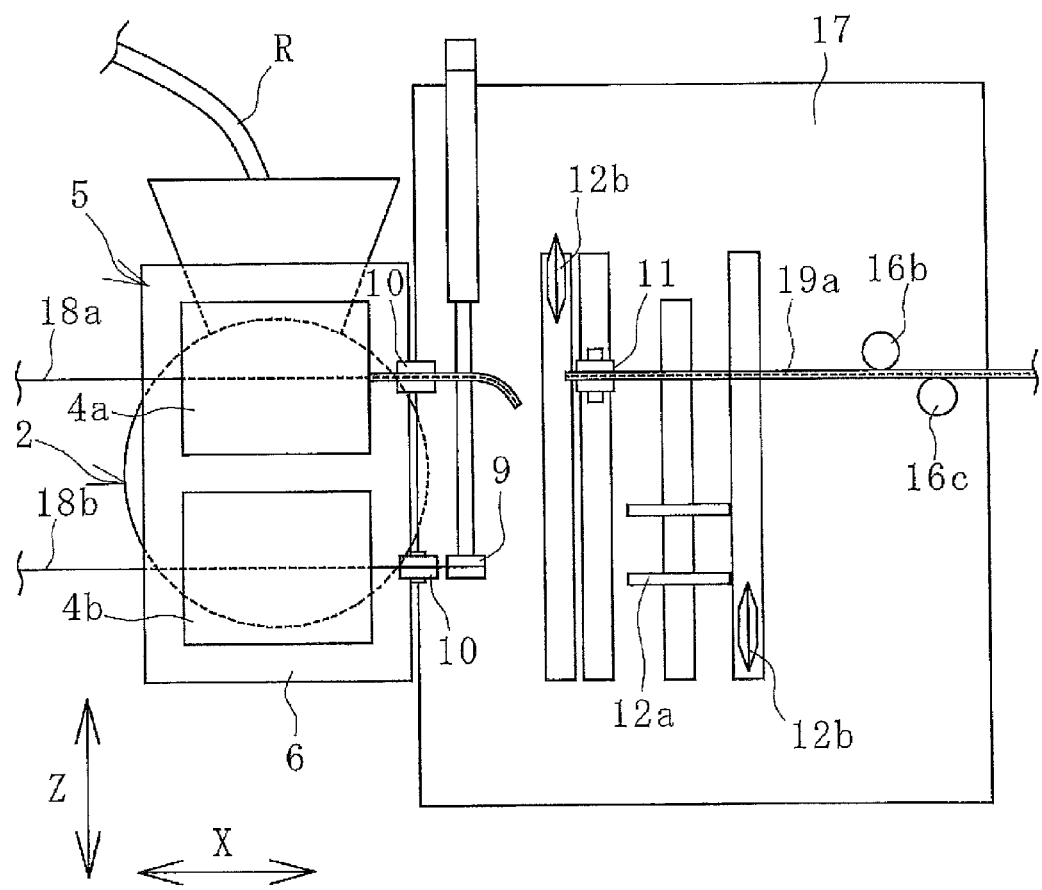
FIG. 7 is an explanatory diagram illustrating, in a front view, the step of holding a leading edge portion of a next cord of FIG. 6 by a movement mechanism.

Accordingly, as illustrated in FIG. 7, the trailing edge portion of the rubber coated cord 19a is held by the trailing edge portion holding machine 11. Additionally, the leading edge portion of the next cord 18b held by the leading edge portion holding machine 10 is held by the movement mechanism 9. The control unit 15 stops the movement of the preceding cord 18a by the draw-out unit 14 and then operates the switching valve 8, and rotates the switching valve 8 from the position of FIG. 4 to the position of FIG. 5.

Figure 8:
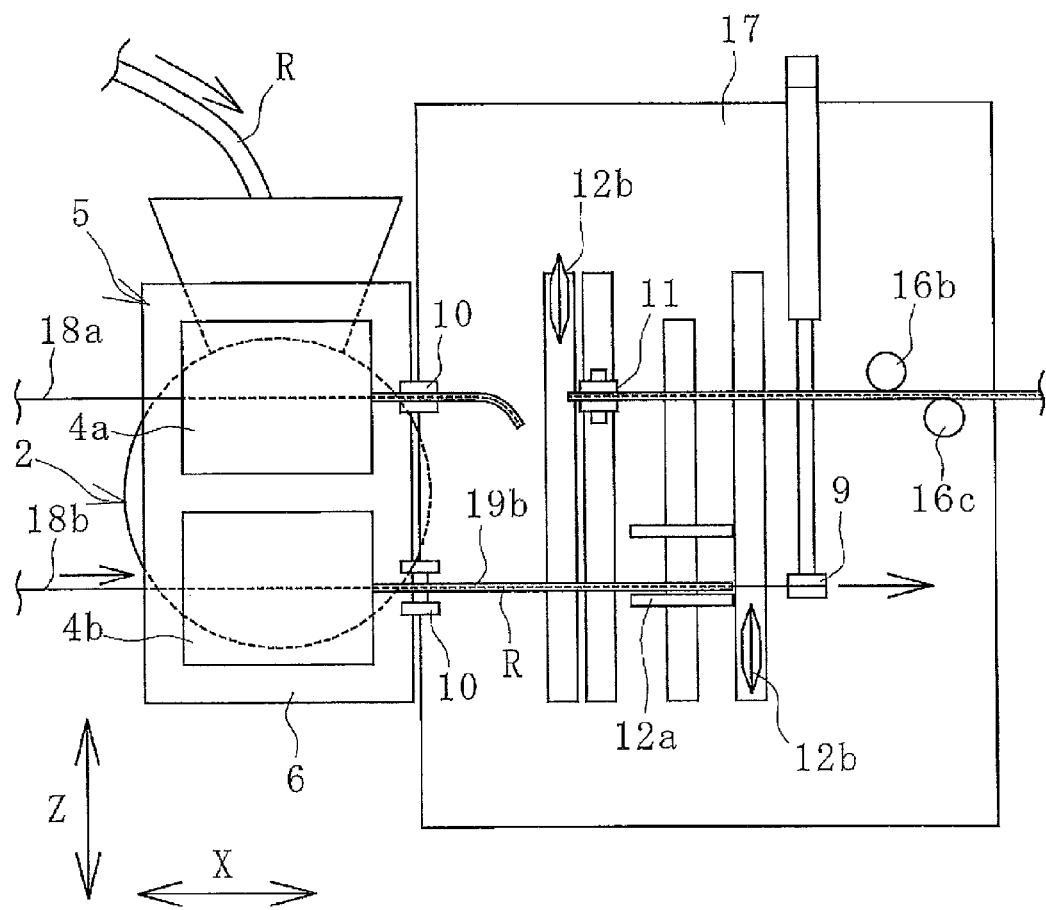
FIG. 8 is an explanatory diagram illustrating, in a front view, the step of drawing out the leading edge portion of the next cord of FIG. 7.

Then, the extrusion of the unvulcanized rubber R by the rubber extruder 2 starts, and in a state where the next head 4b is filled with the unvulcanized rubber R, the movement mechanism 9 is moved in the X direction as illustrated in FIG. 8. At this time, the holding of the next cord 18b by the leading edge portion holding machine 10 is released. Accordingly, the rubber coated cord 19b including the next cord 18b is manufactured, and thus, a leading edge portion of the rubber coated cord 19b is moved by the movement mechanism 9 to the position of the bonding mechanism 12a.

Figure 9:
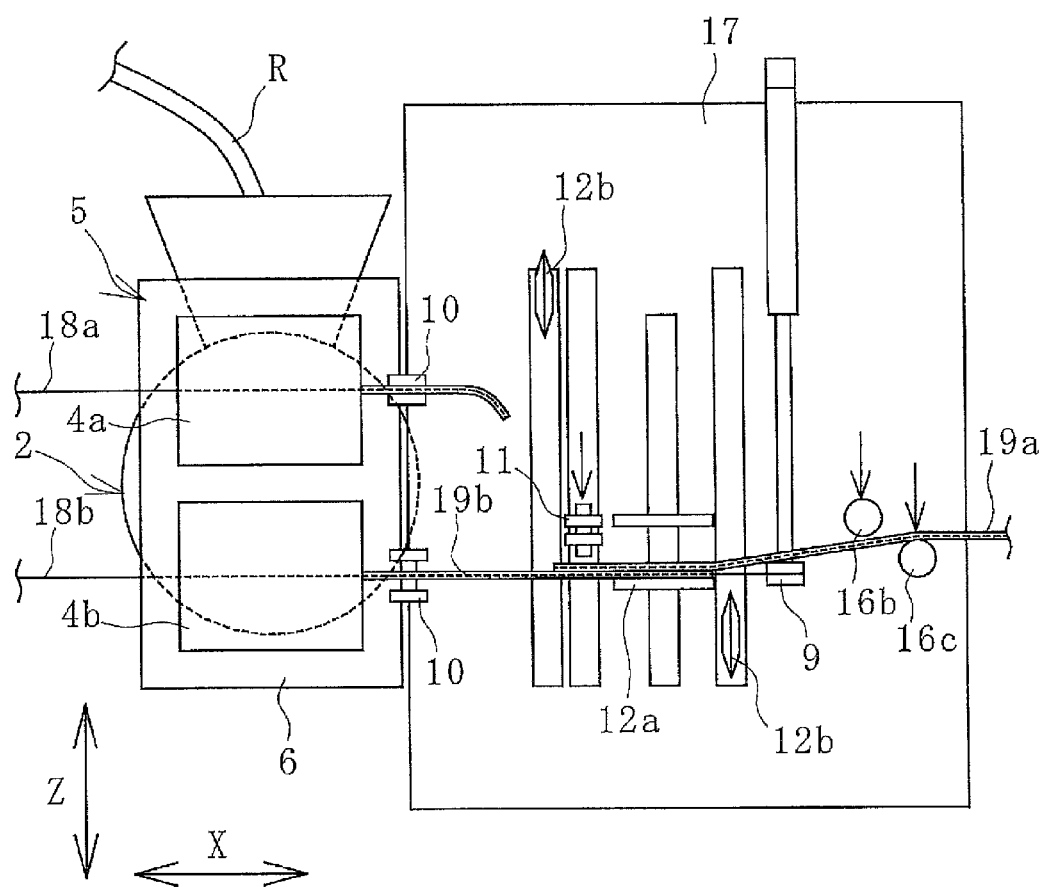
FIG. 9 is an explanatory diagram illustrating, in a front view, the step of layering a trailing edge portion of a preceding cord and a leading edge portions side range of a next cord of FIG. 8.

Then, as illustrated in FIG. 9, the trailing edge portion holding machine 11 and the support rollers 16b and 16c are moved downward, and the holding of the rubber coated cord 19a by the trailing edge portion holding machine 11 is released. Accordingly, the rubber coated cord 19a and the rubber coated cord 19b are disposed in the bonding mechanism 12a in a state where the trailing edge portion of the rubber coated cord 19a and the leading edge portion of the rubber coated cord 19b are layered.

Figure 10:
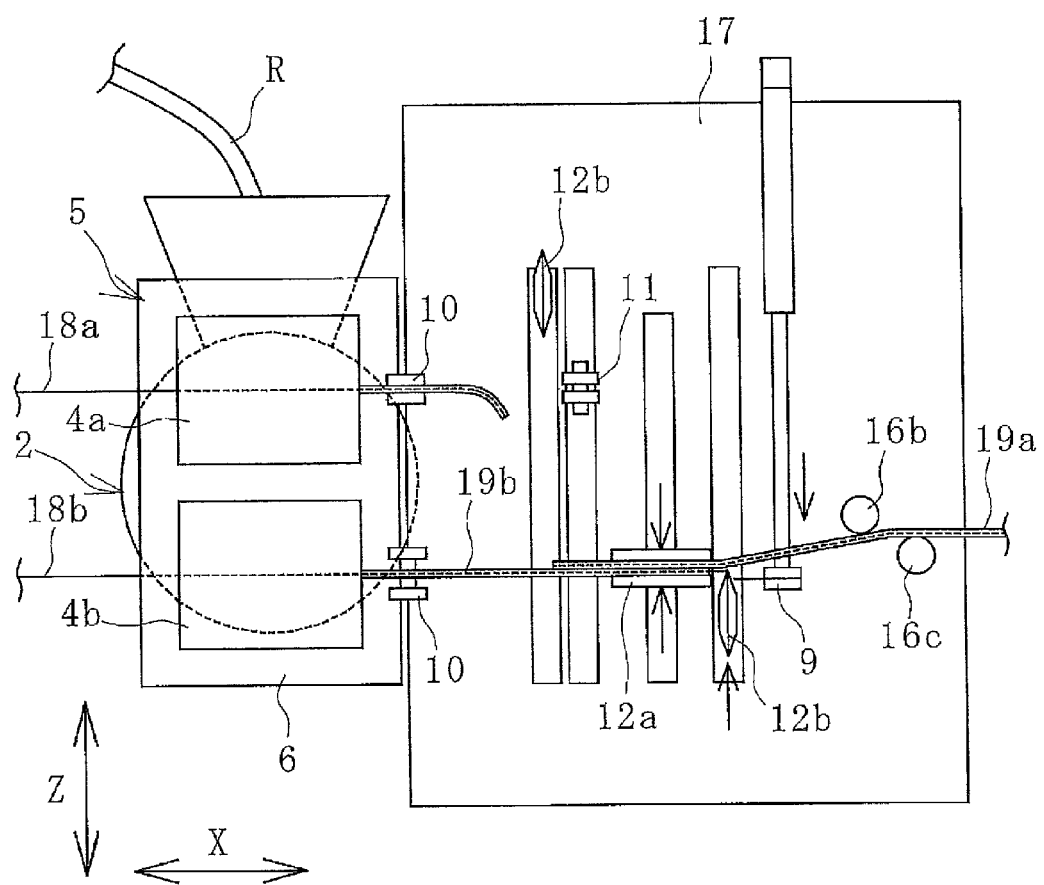
FIG. 10 is an explanatory diagram illustrating, in a front view, the step of bonding the trailing edge portion of the preceding cord and the leading edge portion side range of the next cord of FIG. 9.
Figure 11:
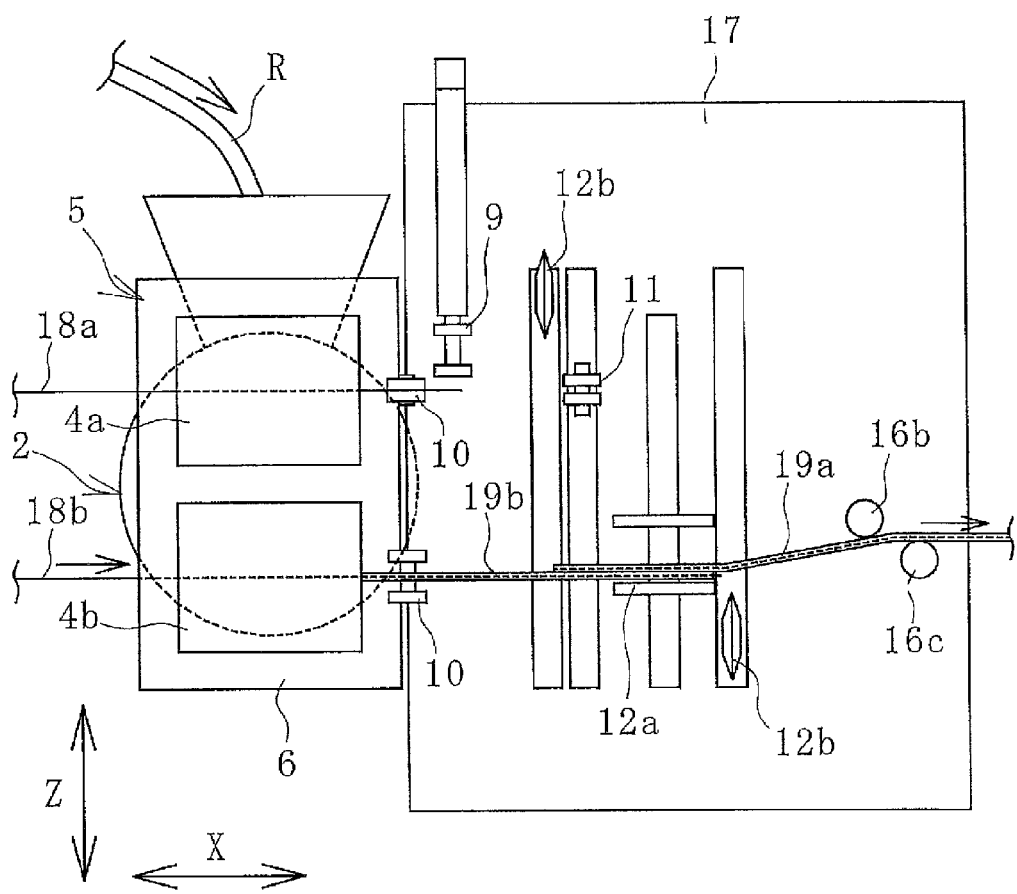
FIG. 11 is an explanatory diagram illustrating, in a front view, the step of manufacturing a rubber coated cord by causing the next cord of FIG. 10 to pass through the next head.

Then, as illustrated in FIG. 10, the trailing edge portion of the rubber coated cord 19a and the leading edge portion of the rubber coated cord 19b layered by the bonding mechanism 12a are compression-bonded and bonded. Additionally, the next cord 18b held by the movement mechanism 9 is cut by the cutting machine 12b disposed in the downstream side in the X direction of the bonding mechanism 12a. At this time, the next cord 18b is easily cut by moving the movement mechanism 9 downward and moving the cutting machine 12b upward.

Then, the compression bonding operation by the bonding mechanism 12a is released, and the cutting machine 12b used for cutting the leading edge portion of the next cord 18b is returned to the standby position. In this state, the movement of the rubber coated cord 19a by the draw-out unit 14 is resumed while filling the next head 4b with the unvulcanized rubber R. Accordingly, the next cord 18b including the leading edge portion end side range bonded to the trailing edge portion of the rubber coated cord 19a passes through the next head 4b. Thus, followed by the manufacture of the rubber coated cord 19a, the rubber coated cord 19b including the next cord 18b is continuously manufactured.

During the manufacture of the rubber coated cord 19b, the preceding cord 18a remaining and a head part are removed from the preceding head 4a. Then, the leading edge portion of the cord 18 to be used next for the next cord 18b is caused to pass through the preceding head 4a, and the head part is reassembled. After the next cord 18b is used, the rubber coated cord 19 is continuously manufactured by a procedure similar to the above-described procedure by using a cord to be used next to the next cord 18b.

According to the manufacturing method, while the rubber coated cord 19a is manufactured in advance by using the preceding head 4a and the preceding cord 18a, the next cord 18b can be set to the next head 4b. In other words, cumbersome work of setting the next cord 18b to the next head 4b can be performed during the manufacture of the rubber coated cord 19a.

In addition, immediately after the manufacture of the rubber coated cord 19a, the leading edge portion side range of the next cord 18b can be bonded to the trailing edge portion of the rubber coated cord 19a. Then, the next cord 18b is caused to pass through the next head 4b by the draw-out unit 14, and the rubber coated cord 19b including the next cord 18b can be manufactured continuously. In this manner, replacement work of the preceding cord 18a and the next cord 18b can be accelerated, and thus this is advantageous for improving the productivity of the rubber coated cord 19. According to an embodiment of the present technology, even in a case where the preceding cord 18a is cut in the middle due to contingency or the like, the cord is switched from the preceding cord 18a to the next cord 18b, and the rubber coated cord 19b can be manufactured smoothly.

Since the replacement work of the cord 18 can be accelerated, the stop time of the rubber extruder 2 is also shortened. Accordingly, fluctuation in the quality of the unvulcanized rubber R remaining inside the rubber extruder 2 can be suppressed. This is also advantageous in that variation in the quality of the rubber coated cord 19 due to the replacement of the cord 18 can be reduced.

In the embodiment, the plurality of cords 18a and 18b arranged side by side are caused to pass through the heads 4a and 4b, respectively. Accordingly, the rubber coated cord 19a including the plurality of cords 18a integrated together in parallel and the rubber coated cord 19b including the plurality of cords 18b integrated together in parallel are manufactured. However, one cord 18a or 18b can be caused to pass through each of the heads 4a and 4b, and one rubber coated cord 19a or 19b can also be manufactured. When the number of the cords 18 caused to pass through the head 4 at a time increases, work of setting the cord 18 to the head 4 becomes more cumbersome. Thus, in such a case, the effect according to an embodiment of the present technology is more significant.

In the embodiment, as illustrated in FIGS. 4 and 5, the switching valve 8 disposed in the switching head 6 is operated, and thus the unvulcanized rubber R is fed to the selected one of the preceding head 4a and the next head 4b. However, other switching valves 8a and 8b illustrated in FIGS. 12 to 15 can be used. Each of the switching valves 8a and 8b is a rod-like body including a hole portion 8c, and moves in the X direction and has a variable insertion depth with respect to the switching head 6. Then, the switching valve 8a is disposed in a communication hole 7a, and the switching valve 8b is disposed in a communication hole 7b.

Figure 12:
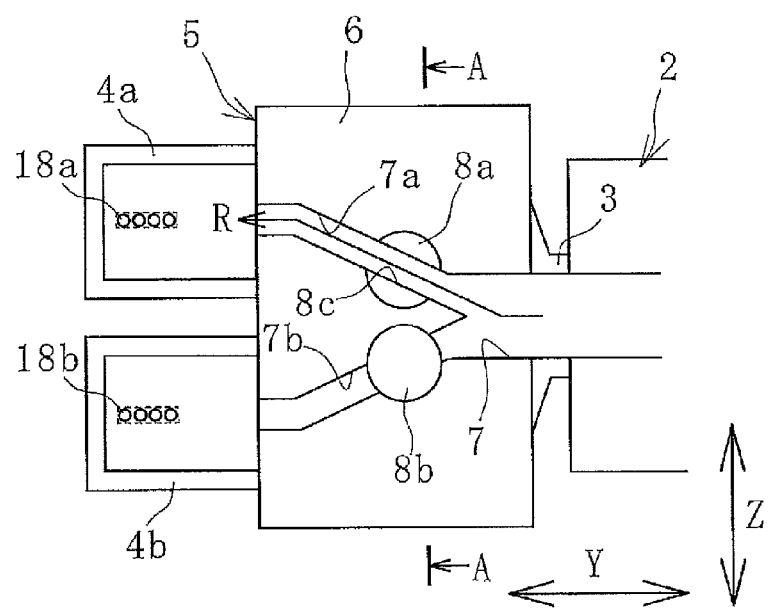
FIG. 12 is an explanatory diagram illustrating a modified example of a switching mechanism, and illustrating, in a cross-sectional view, a state where unvulcanized rubber is fed to a preceding head.
Figure 13:
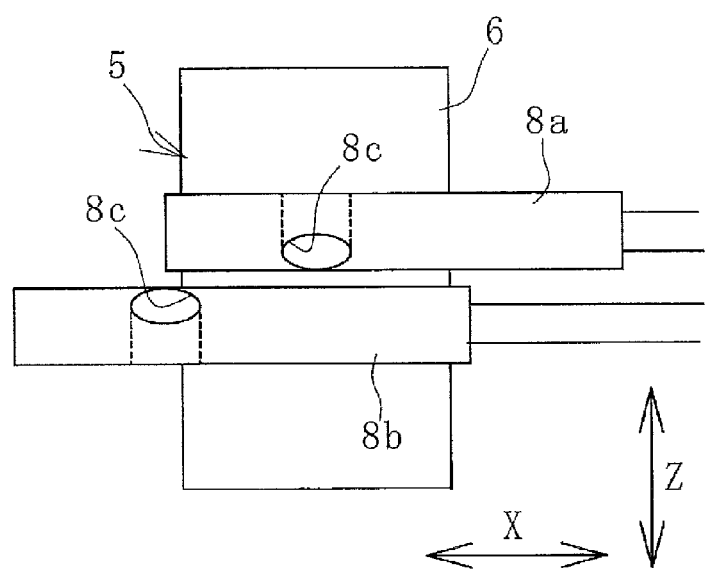
FIG. 13 is an explanatory diagram illustrating the switching mechanism in a cross-sectional view taken along A-A of FIG. 12.

As illustrated in FIG. 12 and FIG. 13, a position of the hole portion 8c of the switching valve 8a is aligned with the communication hole 7a, and a position of the hole portion 8c of the switching valve 8b is displaced from the communication hole 7b. Accordingly, an extrusion port 3 and a preceding head 4a communicate through the communication hole 7a. Accordingly, unvulcanized rubber R is fed only to the preceding head 4a.

Figure 14:
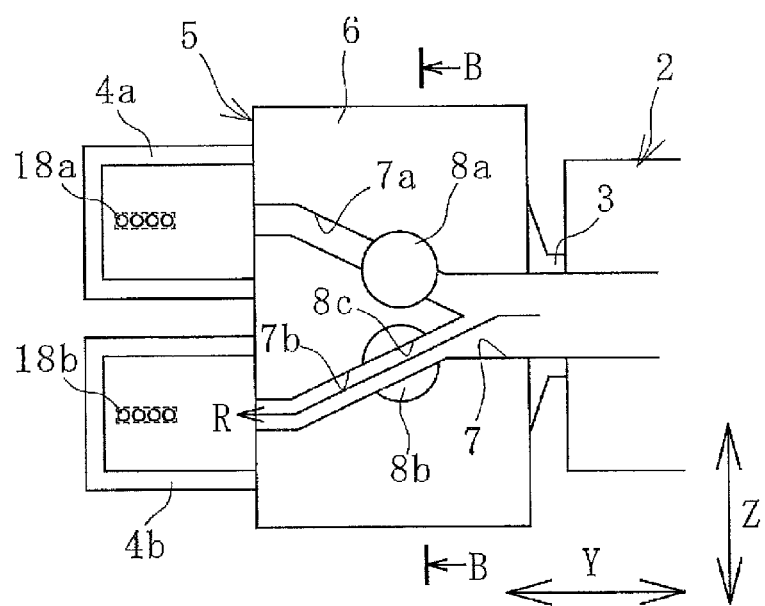
FIG. 14 is an explanatory diagram illustrating, in a cross-sectional view, a state where the switching mechanism of FIG. 12 feeds unvulcanized rubber to a next head.
Figure 15:
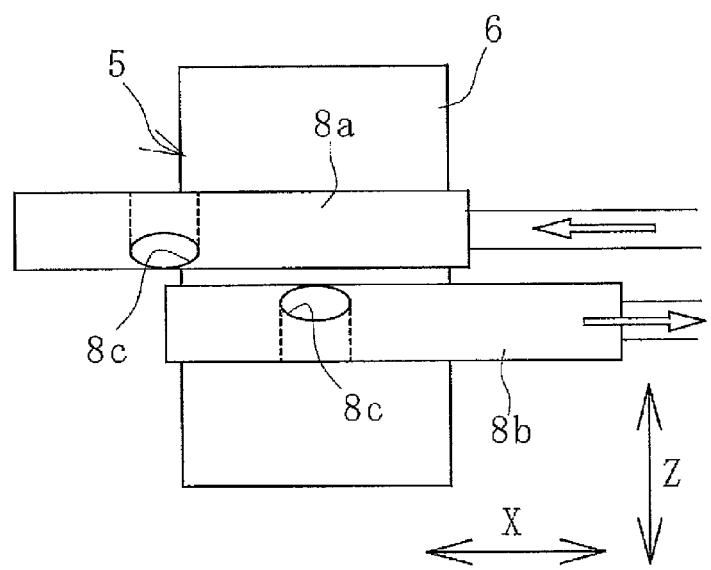
FIG. 15 is an explanatory diagram illustrating the switching mechanism in a cross-sectional view taken along B-B of FIG. 14.

As illustrated in FIG. 14 and FIG. 15, the position of the hole portion 8c of the switching valve 8b is aligned with the communication hole 7b, and the position of the hole portion 8c of the switching valve 8a is displaced from the communication hole 7a. Accordingly, the extrusion port 3 and a next head 4b communicate through the communication hole 7b. Accordingly, the unvulcanized rubber R is fed only to the next head 4b.

According to each of the switching mechanisms 5 using the switching valves 8, 8a, and 8b illustrated in FIGS. 4, 5, and 12 to 15, a feed destination of the unvulcanized rubber R can be changed simply by actuating the switching valve 8, 8a, or 8b disposed inside the switching head 6 while the rubber extruder 2 and the coating head 4 remain immovable. Thus, this is useful in a case where an installation space (movable space) of the manufacturing device 1 is small.

Figure 16:
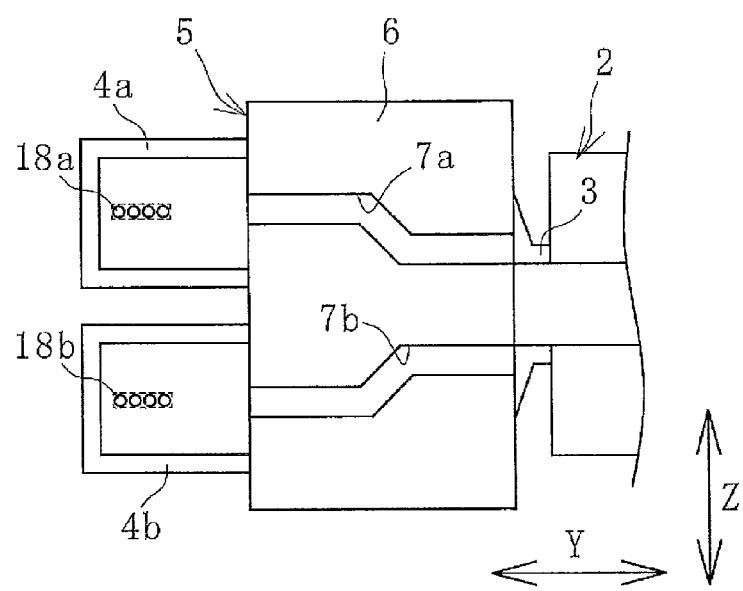
FIG. 16 is an explanatory diagram illustrating another modified example of a switching mechanism in a cross-sectional view.

As illustrated in FIGS. 16 to 20, a switching head 6 including communication holes 7a and 7b can also be interposed between a preceding head 4a and a next head 4b, and a rubber extruder 2, and the switching head 6 can also be moved relatively with respect to the rubber extruder 2. As illustrated in FIG. 16, in the switching head 6, the communication holes 7a and 7b that are independent of each other and that are connected to the preceding head 4a and the next head 4b are formed. In the state illustrated in FIG. 16, an extrusion port 3 does not communicate with any of the communication holes 7a and 7b.

Figure 17:
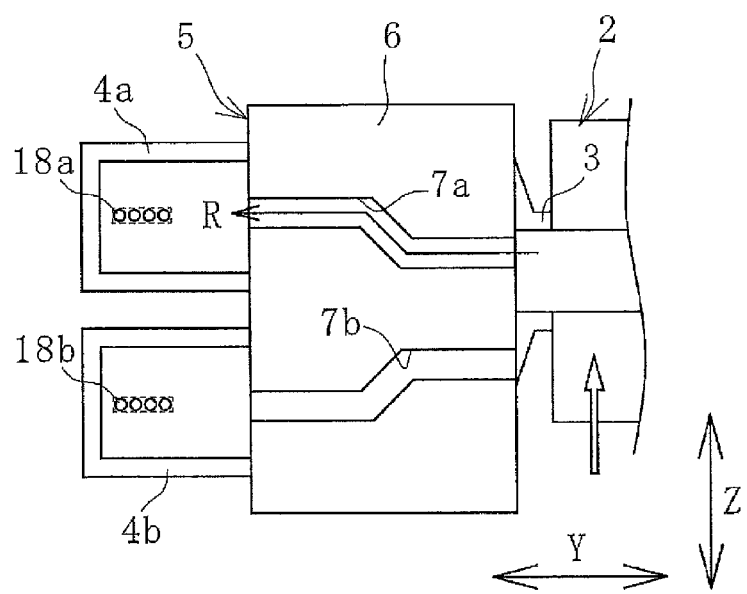
FIG. 17 is an explanatory diagram illustrating, in a cross-sectional view, a state where a rubber extruder of FIG. 16 is slid to feed unvulcanized rubber to a preceding head.
Figure 18:
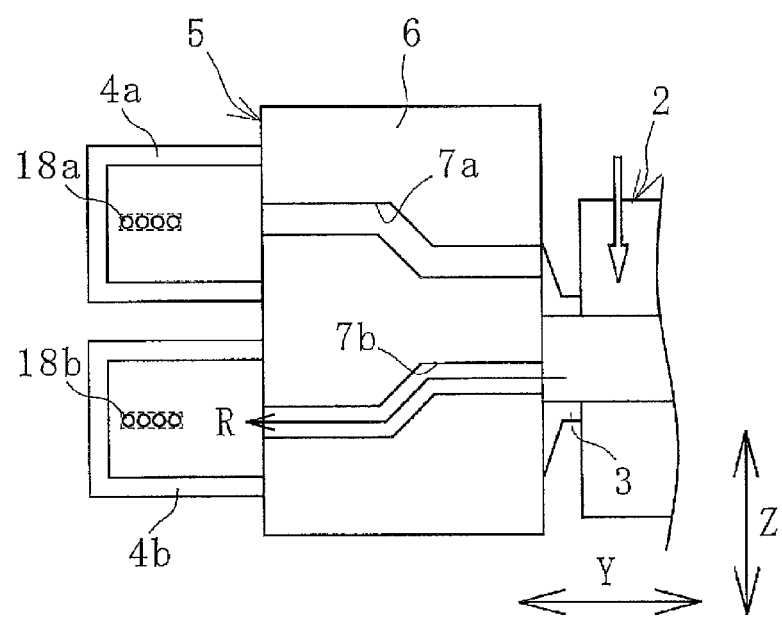
FIG. 18 is an explanatory diagram illustrating, in a cross-sectional view, a state where the rubber extruder of FIG. 17 is slid to feed unvulcanized rubber to a next head.

As illustrated in FIG. 17, the rubber extruder 2 is moved upward in a state where each of the heads 4a and 4b and the switching head 6 remain immovable, and thus the extrusion port 3 communicates through the communication hole 7a with the preceding head 4a. Accordingly, unvulcanized rubber R is fed only to the preceding head 4a. As illustrated in FIG. 18, the rubber extruder 2 is moved downward in a state where each of the heads 4a and 4b and the switching head 6 remain immovable, and thus the extrusion port 3 communicates through the communication hole 7b with the next head 4b. Accordingly, the unvulcanized rubber R is fed only to the next head 4b.

Figure 19:
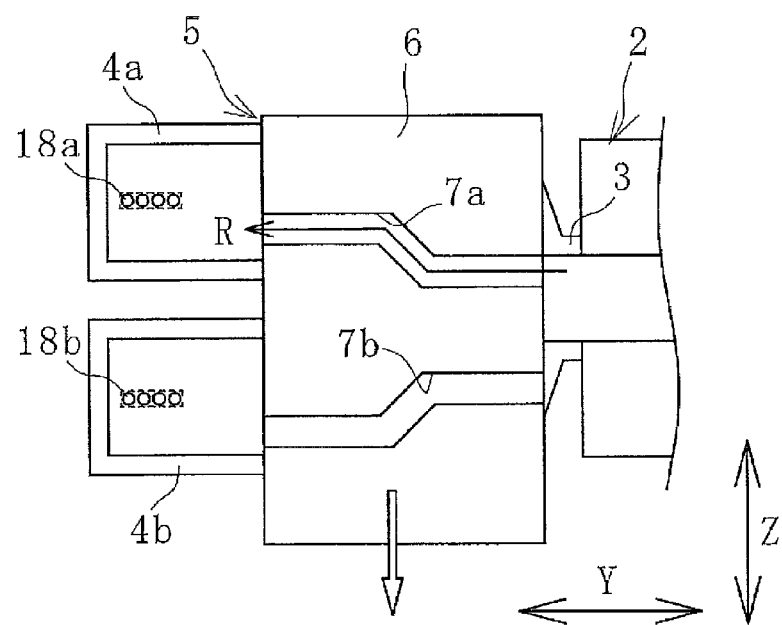
FIG. 19 is an explanatory diagram illustrating, in a cross-sectional view, a state where a switching head of FIG. 16 is slid to feed unvulcanized rubber to a preceding head.
Figure 20:
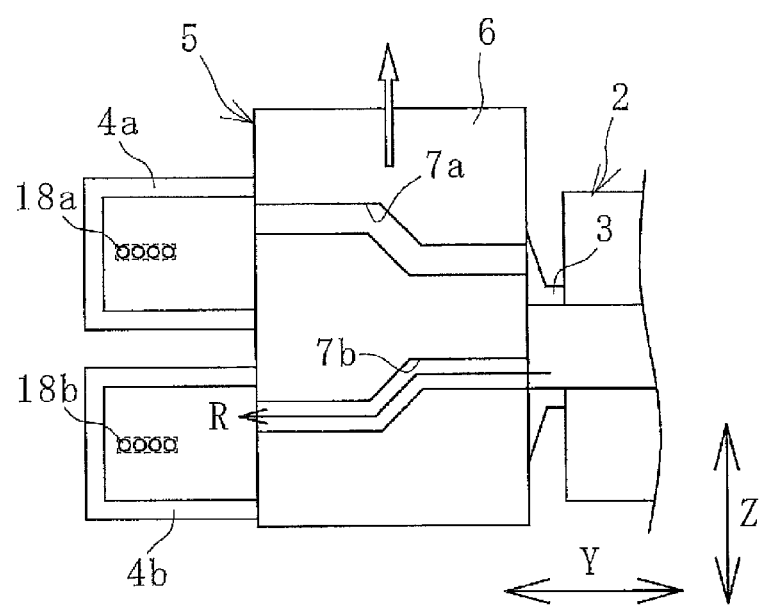
FIG. 20 is an explanatory diagram illustrating, in a cross-sectional view, a state where the switching head of FIG. 19 is slid to feed unvulcanized rubber to a next head.

As illustrated in FIG. 19, the switching head 6 is moved downward in a state where each of the heads 4a and 4b and the rubber extruder 2 remain immovable, and thus the extrusion port 3 communicates through the communication hole 7a with the preceding head 4a. Accordingly, the unvulcanized rubber R is fed only to the preceding head 4a. As illustrated in FIG. 20, the switching head 6 is moved upward in a state where each of the heads 4a and 4b and the rubber extruder 2 remain immovable, and thus the extrusion port 3 communicates through the communication hole 7b with the next head 4b. Accordingly, the unvulcanized rubber R is fed only to the next head 4b.

As illustrated in FIGS. 21 to 25, a switching head 6 including a communication hole 7 can also be interposed between a preceding head 4a and a next head 4b, and a rubber extruder 2, and the preceding head 4a and the next head 4b can also be moved relatively with respect to the switching head 6.

Figure 21:
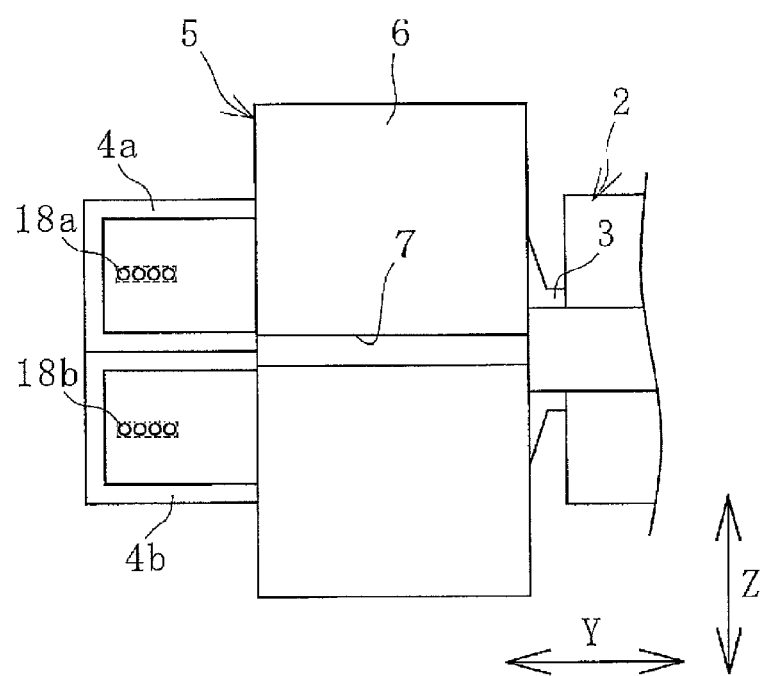
FIG. 21 is an explanatory diagram illustrating yet another modified example of a switching mechanism in a cross-sectional view.

As illustrated in FIG. 21, in the switching head 6, the communication hole 7 penetrating the switching head 6 from a side of the rubber extruder 2 toward a side of the preceding head 4a and the next head 4b is formed. The number of the communication holes 7 is not limited to one, and a plurality of the communication holes 7 can also be formed. In the state of FIG. 21, the communication hole 7 does not communicate with any of the heads 4a and 4b.

Figure 22:
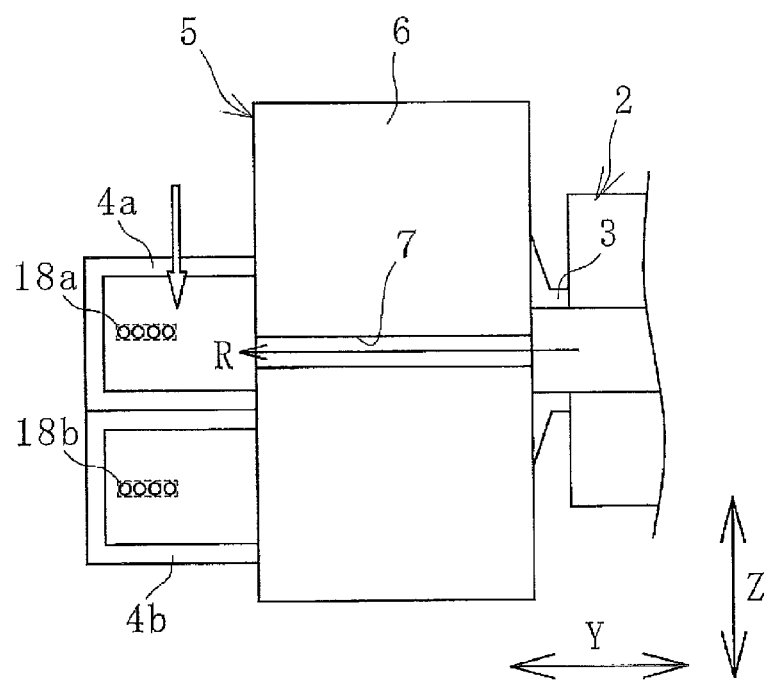
FIG. 22 is an explanatory diagram illustrating, in a cross-sectional view, a state where a preceding head and a next head of FIG. 21 are slid to feed unvulcanized rubber to the preceding head.
Figure 23:
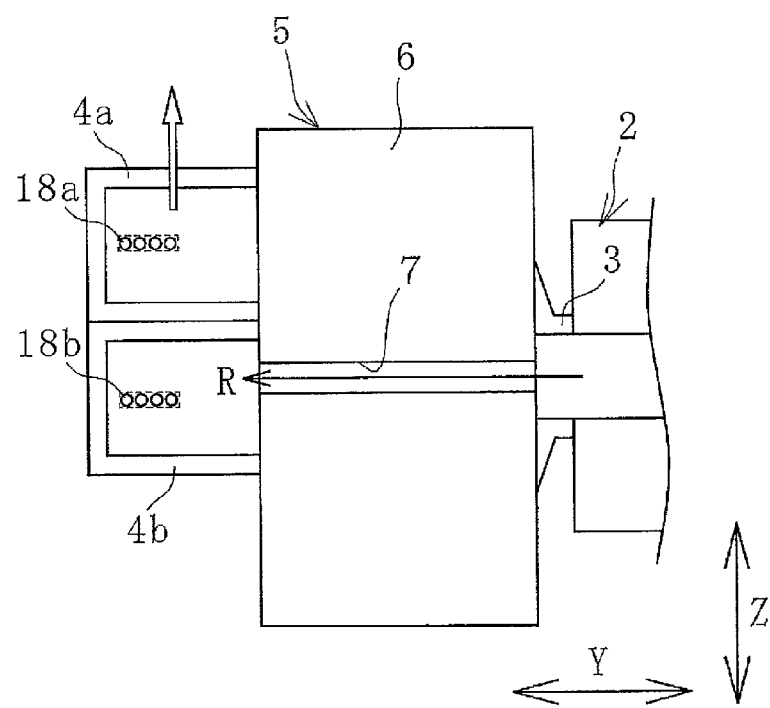
FIG. 23 is an explanatory diagram illustrating, in a cross-sectional view, a state where a preceding head and a next head of FIG. 21 are slid to feed unvulcanized rubber to the next head.

As illustrated in FIG. 22, each of the heads 4a and 4b is moved downward in a state where the rubber extruder 2 and the switching head 6 remain immovable, and thus an extrusion port 3 communicates through the communication hole 7 with the preceding head 4a. Accordingly, unvulcanized rubber R is fed only to the preceding head 4a. As illustrated in FIG. 23, each of the heads 4a and 4b is moved upward in a state where the rubber extruder 2 and the switching head 6 remain immovable, and thus the extrusion port 3 communicates through the communication hole 7 with the next head 4b. Accordingly, the unvulcanized rubber R is fed only to the next head 4b.

Figure 24:
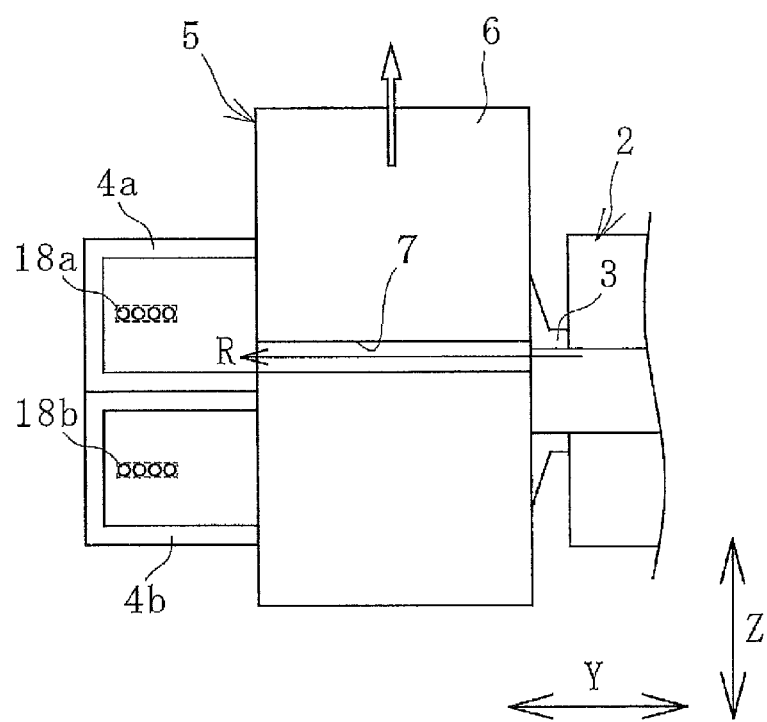
FIG. 24 is an explanatory diagram illustrating, in a cross-sectional view, a state where a switching head of FIG. 21 is slid to feed unvulcanized rubber to a preceding head.
Figure 25:
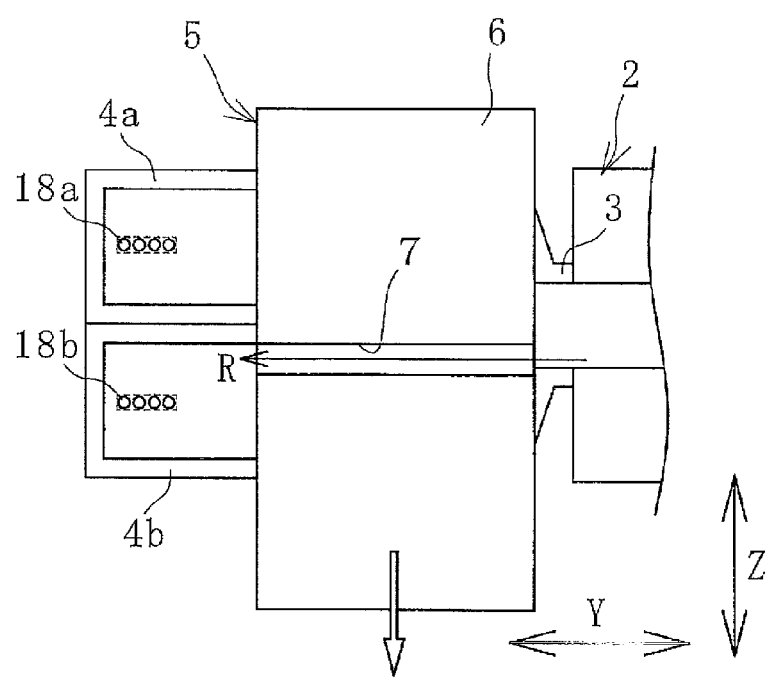
FIG. 25 is an explanatory diagram illustrating, in a cross-sectional view, a state where a switching head of FIG. 21 is slid to feed unvulcanized rubber to a next head.

As illustrated in FIG. 24, the switching head 6 is moved upward in a state where the rubber extruder 2 and each of the heads 4a and 4b remain immovable, and thus the extrusion port 3 communicates through the communication hole 7 with the preceding head 4a. Accordingly, the unvulcanized rubber R is fed only to the preceding head 4a. As illustrated in FIG. 25, the switching head 6 is moved downward in a state where the rubber extruder 2 and each of the heads 4a and 4b remain immovable, and thus the extrusion port 3 communicates through the communication hole 7 with the next head 4b. Accordingly, the unvulcanized rubber R is fed only to the next head 4b.

The invention claimed is:

1. A method for manufacturing a rubber coated twisted cord, the method comprising manufacturing a rubber coated cord by causing a cord to pass through a coating head while filling the coating head with unvulcanized rubber extruded from a rubber extruder and coating an outer circumferential surface of the cord with the unvulcanized rubber, the method comprising:

manufacturing the rubber coated cord comprising a preceding cord by installing a plurality of the coating heads, selecting one head of the plurality of the coating heads as a preceding head, and causing the preceding cord, which is to be used in advance as the cord, to pass through the preceding head while filling the preceding head with the unvulcanized rubber; and manufacturing the rubber coated cord comprising a next cord by selecting, as a next head, one head differing from the preceding head, setting a leading edge portion of the next cord, which is to be used next as the cord, in a state where the leading edge portion of the next cord has passed through the next head in advance, manufacturing a predetermined length of the rubber coated cord comprising the preceding cord, and subsequently causing the next cord comprising a leading edge portion side range bonded to a trailing edge portion of the rubber coated cord comprising the preceding cord to pass through the next head while switching from the preceding head to the next head to stop filling the preceding head with the unvulcanized rubber and to start filling the next head with the unvulcanized rubber.

2. The method for manufacturing a rubber coated cord according to claim 1, wherein the rubber coated cord comprising a plurality of the preceding cords integrated together in parallel is manufactured by causing the plurality of the preceding cords arranged side by side to pass through the preceding head, and the rubber coated cord comprising a plurality of the next cords integrated together in parallel is manufactured by causing the plurality of the next cords arranged side by side to pass through the next head.

3. The method for manufacturing a rubber coated cord according to claim 2, wherein a selected one of the preceding head and the next head is filled through a communication hole with the unvulcanized rubber extruded from the rubber extruder by interposing a switching head comprising the communication hole between the preceding head and the next head, and the rubber extruder, and relatively moving the preceding head and the next head with respect to the switching head.

4. The method for manufacturing a rubber coated cord according to claim 2, wherein a selected one of the preceding head and the next head is filled through a communication hole with the unvulcanized rubber extruded from the rubber extruder by interposing a switching head comprising the communication hole between the preceding head and the next head, and the rubber extruder, and relatively moving the switching head with respect to the rubber extruder.

5. The method for manufacturing a rubber coated cord according to claim 2, wherein a selected one of the preceding head and the next head is filled through a communication hole with the unvulcanized rubber extruded from the rubber extruder by interposing a switching head comprising the communication hole between the preceding head and the next head, and the rubber extruder, and operating a switching valve disposed in the communication hole.

6. The method for manufacturing a rubber coated cord according to claim 1, wherein a selected one of the preceding head and the next head is filled through a communication hole with the unvulcanized rubber extruded from the rubber extruder by interposing a switching head comprising the communication hole between the preceding head and the next head, and the rubber extruder, and relatively moving the preceding head and the next head with respect to the switching head.

7. The method for manufacturing a rubber coated cord according to claim 1, wherein a selected one of the preceding head and the next head is filled through a communication hole with the unvulcanized rubber extruded from the rubber extruder by interposing a switching head comprising the communication hole between the preceding head and the next head, and the rubber extruder, and relatively moving the switching head with respect to the rubber extruder.

8. The method for manufacturing a rubber coated cord according to claim 1, wherein a selected one of the preceding head and the next head is filled through a communication hole with the unvulcanized rubber extruded from the rubber extruder by interposing a switching head comprising the communication hole between the preceding head and the next head, and the rubber extruder, and operating a switching valve disposed in the communication hole.

9. A device for manufacturing a rubber coated cord, the device comprising: a pay-out unit and a draw-out unit for a cord; a rubber extruder; and a coating head installed between the pay-out unit and the draw-out unit and filled with unvulcanized rubber extruded by the rubber extruder;
   an outer circumferential surface of the cord being coated with the unvulcanized rubber by causing the cord moving from the pay-out unit to the draw-out unit to pass through the coating head filled with the unvulcanized rubber;
   the device comprising a plurality of the coating heads, one head of the plurality of the coating heads being selected as a preceding head through which a preceding cord to be used in advance as the cord passes, one head differing from the preceding head being selected as a next head through which a next cord to be used next as the cord passes, and
   the device comprising a switching mechanism that selectively feeds the unvulcanized rubber to any one of the preceding head or the next head, a leading edge portion holding machine that holds a leading edge portion of the next cord having passed through the next head in advance, a trailing edge portion holding machine that holds a trailing edge portion of a predetermined length of the rubber coated cord manufactured by using the preceding cord, and a bonding mechanism that bonds the trailing edge portion to a leading edge portion side range of the next cord.

* * * * *